US009631043B2

(12) United States Patent
Esbelin et al.

(10) Patent No.: US 9,631,043 B2
(45) Date of Patent: Apr. 25, 2017

(54) INTERMEDIATE POLYISOCYANURATE COMPRISING MATERIALS

(71) Applicant: Huntsman International LLC, The Woodlands, TX (US)

(72) Inventors: Christian Esbelin, Schaerbeek (BE); Hugo Verbeke, Wilsele (BE); Hans Godelieve Guido Verbeke, Lubbeek (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/413,459

(22) PCT Filed: Jun. 18, 2013

(86) PCT No.: PCT/EP2013/062597
§ 371 (c)(1),
(2) Date: Jan. 8, 2015

(87) PCT Pub. No.: WO2014/012728
PCT Pub. Date: Jan. 23, 2014

(65) Prior Publication Data
US 2015/0158967 A1    Jun. 11, 2015

(30) Foreign Application Priority Data
Jul. 17, 2012    (EP) .................................... 12176644

(51) Int. Cl.
*C08G 18/16* (2006.01)
*C08J 3/00* (2006.01)
(Continued)

(52) U.S. Cl.
CPC ......... *C08G 18/161* (2013.01); *C08G 18/089* (2013.01); *C08G 18/092* (2013.01);
(Continued)

(58) Field of Classification Search
None
See application file for complete search history.

(56) References Cited

U.S. PATENT DOCUMENTS 3,259,625 A * 7/1966 Ugi ...................... C08G 18/022
544/193
3,489,696 A * 1/1970 Miller .................. C08G 18/343
521/157
(Continued)

FOREIGN PATENT DOCUMENTS

EP    0 435 060    7/1991
EP    0 447 093    9/1991
(Continued)

OTHER PUBLICATIONS

Woods, George; The ICI Polyurethanes Book, 2nd Edition, pp. 32-35, 1990.

*Primary Examiner* — Jeffrey Washville
(74) *Attorney, Agent, or Firm* — Huntsman International LLC; Lewis Craft

(57) ABSTRACT

A stable partly cured polyisocyanate composition is disclosed which comprises polyisocyanurate (intermediate polyisocyanurate comprising material) and which is further curable. Furthermore a process for making the intermediate (partly cured) polyisocyanurate comprising material and a process for further curing the partly cured polyisocyanurate composition is disclosed. Also polyisocyanurate comprising materials made or obtainable from partly cured intermediate polyisocyanurate comprising material are disclosed and processes for further curing a partly cured polyisocyanurate comprising composition (intermediate material).

26 Claims, 4 Drawing Sheets

(51) Int. Cl.
*C08J 3/20* (2006.01)
*C08G 18/72* (2006.01)
*C08G 18/48* (2006.01)
*C08G 18/54* (2006.01)
*C08G 18/79* (2006.01)
*C08G 18/08* (2006.01)
*C08G 18/09* (2006.01)
*C08G 18/32* (2006.01)
*C08K 5/21* (2006.01)

(52) U.S. Cl.
CPC ..... *C08G 18/3206* (2013.01); *C08G 18/4816* (2013.01); *C08G 18/4829* (2013.01); *C08G 18/4833* (2013.01); *C08G 18/54* (2013.01); *C08G 18/72* (2013.01); *C08G 18/791* (2013.01); *C08J 3/005* (2013.01); *C08J 3/203* (2013.01); *C08J 2375/04* (2013.01); *C08J 2463/00* (2013.01); *C08K 5/21* (2013.01)

(56) References Cited

U.S. PATENT DOCUMENTS

| | | |
|---|---|---|
| 3,970,600 A | 7/1976 | Falkenstein et al. |
| 4,284,730 A | 8/1981 | Narayan et al. |
| 4,302,351 A | 11/1981 | Gras et al. |
| 4,537,961 A | 8/1985 | Robin |
| 4,697,014 A | 9/1987 | Robin |
| 4,743,627 A | 5/1988 | Narayan et al. |
| 4,919,878 A * | 4/1990 | Pilger ............. B29C 33/60 264/300 |
| 5,124,370 A | 6/1992 | Scholl et al. |
| 5,221,743 A | 6/1993 | Goldstein et al. |
| 5,223,551 A * | 6/1993 | Gattuso ........... C08G 18/325 521/131 |
| 5,369,207 A | 11/1994 | Wolff et al. |
| 5,817,732 A | 10/1998 | Asahina et al. |
| 6,127,308 A | 10/2000 | Slack et al. |
| 7,071,353 B2 | 7/2006 | Gurtler et al. |
| 7,553,963 B2 | 6/2009 | Slack et al. |
| 2004/0176562 A1 | 9/2004 | Kohlstruk et al. |
| 2010/0022707 A1 | 1/2010 | Schaefer et al. |
| 2010/0292396 A1 | 11/2010 | Binder et al. |
| 2011/0237741 A1 | 9/2011 | Bleys et al. |

FOREIGN PATENT DOCUMENTS

| | | |
|---|---|---|
| EP | 1 454 933 | 9/2004 |
| JP | 02-110123 | 4/1990 |
| WO | 2012/103965 | 8/2012 |

* cited by examiner

US 9,631,043 B2

INTERMEDIATE POLYISOCYANURATE COMPRISING MATERIALS

This application is the National Phase of International Application PCT/EP2013/062597 filed Jun. 18, 2013 which designated the U.S. and which claims priority to Foreign Application No. 12176644.8 filed Jul. 17, 2012. The noted applications are incorporated herein by reference.

FIELD OF INVENTION

The present invention relates to a stable partly cured polyisocyanate composition which comprises polyisocyanurate (referred to as intermediate polyisocyanurate comprising material) and which is further curable.

The present invention is further related to a process for making an intermediate (partly cured) polyisocyanurate comprising material and to a process for further curing the partly cured polyisocyanurate composition wherein a trimerization catalyst composition according to the present invention is used.

The present invention is further related to a polyisocyanurate comprising material made or obtainable from such partly cured intermediate polyisocyanurate comprising material and to a process for further curing said partly cured polyisocyanurate comprising composition (intermediate material).

The present invention is further related to the use of a trimerization catalyst composition according to the present invention which makes it possible to produce a "stable" and "partly cured" intermediate polyisocyanurate comprising material starting from a polyisocyanate composition.

BACKGROUND OF THE INVENTION

WO2010023060 discloses a curable composition and a process for forming a polyisocyanurate by combining an isocyanate-reactive mixture comprising a polyol, an anhydride and a trimerization catalyst with a polyisocyanate. The trimerization catalyst is selected from alkali metal carboxylates, quaternary ammonium carboxylates and mixtures thereof, the carboxylate having 1-12 carbon atoms.

In U.S. Pat. No. 3,970,600 stable solutions of isocyanurate-polyisocyanates containing amide and/or acylurea groups have been described. They avoid deposition of fine or coarse crystalline solids in polyisocyanates comprising isocyanurate groups. First a polyisocyanate is reacted with polybasic carboxylic acid to prepare a polyisocyanate with amide and/or—substituted—acylurea groups. Then this polyisocyanate is trimerized to form an isocyanurate-polyisocyanate and this conversion is stopped by adding acid.

In JP 2-110123 an aliphatic diisocyanate is trimerized to prepare polyisocyanates which have an isocyanurate structure using a catalyst and a deactivating agent once the desired degree of conversion has been attained (in other words the deactivating agent is used as terminating agent to stop the trimerization reaction). The deactivating agent has the structure —CO—NH$_2$ or —SO—NH$_2$ and may be urea, methyl urea, 1,1-dimethyl urea, phenyl carbamate, ethylcarbamate or butylcarbamate. Subsequently deactivated catalyst, excess diisocyanate and solvent, if used, are eliminated. By using this deactivating agent the polyisocyanate comprising polyisocyanurate structure shows a lower degree of discoloration. JP 2-110123 does not disclose further curable polyisocyanurate comprising materials.

EP0435060 discloses a liquid casting composition prepared by reacting polyisocyanates with an organic compound containing at least two epoxide groups in a quantity corresponding to an equivalent ratio of isocyanate groups to epoxide groups of about 1.2:1 to about 500:1 and a tertiary amine as catalyst until an intermediate product having a conversion of max. 65% of the isocyanate groups is achieved by adding a stabilizing component comprising at least one alkylating sulfonic acid alkyl ester. Because the reaction does not stop automatically, a stabilizing agent must be added once a conversion of max. 65% of the isocyanate groups is achieved in order to stop the reaction which makes the process very difficult to stear in advance. Further reaction may be obtained by adding subsequently a heat-activatable catalyst selected from tertiary and/or quaternary ammonium salts of an alkylating or acidic ester of organic phosphonic acid and/or addition of complex of boron trihalides with tertiary amines.

US2004/0176562 discloses a method for the production of stable, low-odor, monomer-containing polyisocyanurates of isophorone di-isocyanate (IPDI). The process involves trimerization in presence of quat. hydroxyalkylammonium compounds followed by a thermal deactivation of the catalyst at 100-160° C.

WO 2008/068198 and US 2010/0022707 disclose a process for preparing an oligomerized polyisocyanate using a catalyst wherein a deactivator is used once the desired conversion has been obtained followed by removal of the polyisocyanate which was not converted. The deactivator may be selected from urea and urea containing compounds, amongst others.

EP 585835 discloses a process for preparing isocyanurate and urethane group containing polyisocyanate mixtures by partially cyclizing diisocyanates in the presence of a trimerization catalyst, deactivating the trimerization catalyst when the desired conversion is achieved, and subsequently reacting the resulting isocyanurate group containing polyisocyanate with hydroxyl compounds and then separating off the monomeric diisocyanate.

Further disclosures related to partially trimerized polyisocyanate compositions using different methods to stop the trimerization are: EP 447093, U.S. Pat. No. 4,284,730, U.S. Pat. No. 4,537,961, U.S. Pat. No. 4,697,014, U.S. Pat. No. 4,743,627, U.S. Pat. No. 5,124,370, U.S. Pat. No. 5,221,743 and U.S. Pat. No. 7,553,963. None of these disclosures reveal the present invention or point into its direction.

In U.S. Pat. No. 7,071,353 reaction products of isocyanates and carboxylic acids are disclosed. First amides are formed which then form acylureas by reaction with further isocyanate groups.

Thermally activated PIR catalysis has been disclosed in U.S. Pat. No. 6,127,308.

Urea and amides have been disclosed as blocking agents in U.S. Pat. No. 5,817,732.

U.S. Pat. No. 4,302,351 discloses isocyanurates and acid hydrogen containing blocking agents.

SUMMARY OF THE INVENTION

According to a first aspect of the present invention, a stable, intermediate and further curable polyisocyanurate comprising material is disclosed.

The intermediate, further curable polyisocyanurate comprising material according to the invention comprises free isocyanate (NCO) groups, has an NCO value of 5-30% by weight, more preferably an NCO value of 15-25% by weight and has a final concentration of the polyisocyanurate compounds which does not change more than 10% from its initial value (calculated as a change in NCO value) when kept at room temperature (around 20° C.) and ambient pressure for at least several hours, more preferably for minimum 5 hours, most preferably for more than 24 hours.

The intermediate and further curable polyisocyanurate comprising material according to the first aspect of the invention has the advantage that additives can be added to the intermediate polyisocyanurate comprising material such as filler material, fibers, . . . . As a result, the intermediate, further curable polyisocyanurate comprising material may further comprise additives and/or to be bonded material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

The intermediate, further curable polyisocyanurate comprising material according to the invention has a further advantage that it is a material in which the formation of polyisocyanurate (PIR reaction) may be stopped (interrupted) intentionally to achieve a desired degree of polyisocyanate conversion into polyisocyanurate and hence intentionally under-cure a polyisocyanate material. State of the art polyisocyanurate comprising materials which still comprise free NCO groups might also cure further but then only at very high temperatures (mostly referred to as "post-curing"), in the scope of this invention further cure means at relatively low temperatures of around 125° C. The further curing according to the invention is always achieved at temperatures below 250° C.

According to a second aspect of the present invention, a process is disclosed for making the stable, intermediate and further curable polyisocyanurate comprising material according to the first aspect of the invention.

The process for making a stable, intermediate and further curable polyisocyanurate comprising material process comprises at least the steps of:

Providing a polyisocyanate composition, and then

Combining and mixing compounds which comprise a group having the structure —CO—$NH_2$ to the polyisocyanate composition, and subsequently or simultaneously Combining and mixing a trimerization catalyst compound to the polyisocyanate composition in such amount that the number of equivalents of compounds which comprise a group having the structure —CO—$NH_2$ over the number of trimerization catalyst equivalents is below 4 and higher than 0.75, preferably in the range between 1 and 3, more preferably in the range between 1.2 and 2, most preferably in the range between 1 up to 1.5, and then Allowing the composition to react, and then Optionally cooling down the composition According to an embodiment the step of allowing the composition to react gives rise to an elevated temperature below 90° C. and naturally cools down to room temperature.

According to an embodiment, the polyisocyanate composition further comprises a monool or polyol composition which preferably comprises polyester and/or polyether polyols having an average molecular weight of preferably 32-6000 and an average nominal functionality of preferably 1-8.

According to an embodiment, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to an embodiment, the trimerization catalyst compound is selected from one or more organic salts, preferably said organic salt is selected from alkali metal, earth alkali metal and/or quaternary ammonium organic salts, more preferably from carboxylates and/or alkoxides such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to an embodiment, the trimerization catalyst compound is selected from a composition containing LiCl and an epoxy resin provided that the number of LiCl equivalents over the number of epoxy equivalents is in the range 1:2 to 1:80, more preferably in the range 1:2 to 1:40, and even more preferably 1:4 to 1:30.

According to an embodiment, the process for forming a stable, intermediate and further curable polyisocyanurate comprising material further comprises the step of (additionally) adding an epoxy resin to the polyisocyanate composition before or alternatively after the step of allowing the polyisocyanate composition which comprises compounds having a group having the structure —CO—$NH_2$ to react with the trimerization catalyst compound in such amounts that the number of equivalents of compounds having a —CO—$NH_2$ group in the polyisocyanate composition is smaller than or equal to the number of epoxy equivalents.

According to a third aspect of the present invention, a process for further curing the intermediate further curable polyisocyanurate comprising material is disclosed as well as said polyisocyanurate comprising material obtained after further curing.

The process for further curing the intermediate polyisocyanurate comprising material according to the invention or the intermediate polyisocyanurate comprising material obtained using the process according to the second aspect of the invention is performed in the presence of an epoxy resin. Said epoxy resin may be added before or after the process of partly curing a polyisocyanate composition.

The process for further curing the intermediate polyisocyanurate comprising material comprises the step of heating said intermediate polyisocyanurate comprising material which comprises an epoxy resin at elevated temperatures of at least 90° C., preferably at least 100° C., more preferably at least 120° C., most preferably equal to or at least 125° C. for at least a few minutes and up to 2 hours.

According to an embodiment of the third aspect of the invention, the process for further curing the intermediate polyisocyanurate comprising material further comprises before the step of heating said composition at elevated temperatures of at least 90° C. a step of additionally adding a trimerization catalyst to the intermediate polyisocyanurate comprising material.

According to an embodiment of the third aspect of the invention, the process for further curing the intermediate polyisocyanurate comprising material further comprises before the step of heating said composition at elevated temperatures of at least 90° C. a step of adding and mixing additives and/or to be bonded material(s) to the intermediate polyisocyanurate comprising material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

According to an embodiment of the third aspect of the invention, the process for further curing the intermediate polyisocyanurate comprising material further comprises another additional post curing step.

Polyisocyanurate comprising materials obtainable by the above described process are disclosed as well.

The independent and dependent claims set out particular and preferred features of the invention. Features from the dependent claims may be combined with features of the independent or other dependent claims as appropriate.

The above and other characteristics, features and advantages of the present invention will become apparent from the detailed description, taken in conjunction with the accompanying examples which illustrate the principles of the invention.

DEFINITIONS AND TERMS

Figure 1:
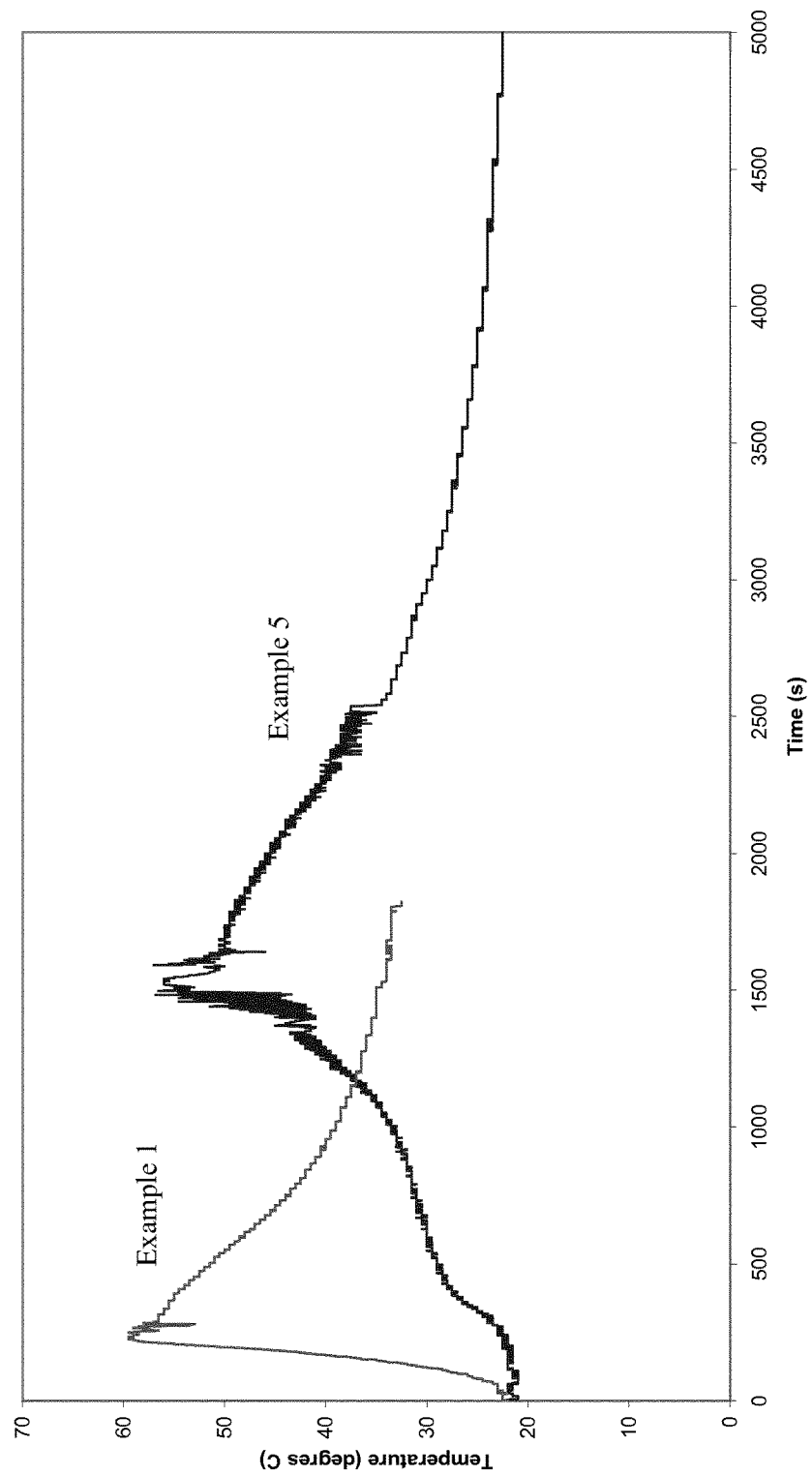
FIG. 1 is a graphical representation of the temperature profile of reacting mixtures during the formation of partially cured polyisocyanurate comprising materials.

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

The NCO value as indicated in the examples is measured using a measurement method based on titration. The isocyanate is reacted with an excess of di-n-butylamine to form ureas. The unreacted amine is then titrated with standard nitric acid to the colour change of bromocresol green indicator or to a potentiometric endpoint. The percent NCO or NCO-value is defined as the percent by weight of NCO-groups present in the product.

Further, it should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Liquid" means having a viscosity of less than 10 Pa·s measured according to ASTM D445-11a at 20° C.

7) (Stable) catalyst composition according to the present invention is a composition comprising at least 1) a trimerization catalyst compound according to the invention and 2) compounds which comprise a carboxamide group having the structure —CO—$NH_2$ according to the invention. The final concentration of the individual compounds in the catalyst composition does not change more than 10% from its initial concentration when kept at room temperature (around 20° C.) and ambient pressure for at least several months. In case the trimerization catalyst is a LiCl based catalyst then the LiCl is always used in combination with an epoxy resin (referred to as "LiCl/epoxy" catalyst) such that the number of LiCl equivalents over the number of epoxy equivalents is in the range 1:2 to 1:80, more preferably in the range 1:2 to 1:40, and even more preferably 1:4 to 1:30.

8) "(Stable) intermediate, further curable polyisocyanate comprising composition" or "intermediate polyisocyanurate comprising material" according to the present invention is a polyisocyanurate comprising material which is able to cure further and is obtained by reacting the (trimerization) catalyst composition according to the invention in specific amounts, a polyisocyanate composition and optionally an epoxy resin for a certain period of time thereby reaching a temperature up to 80° C. but certainly below 90° C. such that a partly cured polyisocyanurate comprising material is obtained which still comprises free isocyanate (NCO) groups, has an NCO value of 5-30% by weight, more preferably an NCO value of between 15 and 25% and wherein the final concentration of the polyisocyanurate compounds does not change more than 10% from its initial value (calculated as a change in NCO value) when kept at room temperature (around 20° C.) and ambient pressure for at least several hours up to days and even up to several weeks, preferably for 1 hour, more preferably for minimum 5 hours, most preferably for more than 24 hours.

9) "Further cured polyisocyanurate comprising material" according to the present invention is a polyisocyanurate comprising material which is obtained by heating up the intermediate, further curable polyisocyanurate comprising material according to the invention to a temperature of at least 90° C., preferably at least 100° C., more preferably at least 120° C., most preferably at least 125° C. for at least a few minutes such that the left over free isocyanate groups reacts to form polyisocyanurate comprising compounds. Said further cured polyisocyanurate comprising material having an increased isocyanate conversion and less or alternatively almost no remaining free reactive isocyanate groups compared to the intermediate polyisocyanurate comprising material.

10) Shelf-life as used herein refers to the stability of a compound or composition comprising a compound in a liquid (e.g. the trimerization catalyst composition according to the invention) when stored under ambient conditions (room temperature and ambient pressure), and is calculated as the period of time the compound or composition retains a viscosity low enough to be used in a given processing, and remains suitable for its intended use.

11) Pot-life as used herein refers to the stability of a liquid reactive composition (e.g. the curable composition according to the invention) when stored under ambient conditions (room temperature and ambient pressure) and is calculated as the period of time the reactive composition remains suitable for its intended processing after mixing with reaction-initiating agents, and/or subjecting to reaction-initiating conditions (such as subjecting to an elevated temperature).

12) Trimerization catalyst as used herein refers to a catalyst being able to catalyse (promote) the formation of isocyanurate groups from polyisocyanates.

13) The compounds which are selected from compounds which comprise a carboxamide group having the structure —CO—NH$_2$ may also be referred to in the invention as "the inhibitor".

14) The composition comprising at least one trimerization catalyst compound according to the invention in combination with at least one compound selected from compounds which comprise a carboxamide group having the structure —CO—NH$_2$ is in the text referred to as "the trimerization catalyst composition" or "the catalyst composition".

DETAILED DESCRIPTION

According to a first aspect of the present invention, a stable, intermediate and further curable polyisocyanurate comprising material is disclosed.

The intermediate, further curable polyisocyanurate comprising material according to the invention comprises free isocyanate (NCO) groups, has an NCO value of 5-30% by weight, more preferably an NCO value of 15-25% by weight and has a final concentration of the polyisocyanurate compounds which does not change more than 10% from its initial value when kept at room temperature (around 20° C.) and ambient pressure for at least several hours, more preferably for minimum 5 hours, most preferably for more than 24 hours. Preferably the intermediate, further curable polyisocyanurate comprising material comprises compounds having a group having the structure —CO—NH$_2$ and a trimerization catalyst compound.

According to a second aspect of the present invention a process for making the stable intermediate and further curable polyisocyanurate comprising material according to the first aspect of the invention is disclosed thereby using a trimerization catalyst composition.

The trimerization catalyst composition is a stable composition which comprises a trimerization catalyst in combination with compounds which comprise a carboxamide group having the structure —CO—NH$_2$. Said stable trimerization catalyst composition has a long shelf-life at 20° C. and ambient pressure of at least several months and longer.

Surprisingly we have found that the catalytic activity of a polyisocyanate trimerization catalyst in a polyisocyanate composition may be interrupted (stopped). To achieve said interruption, any trimerization catalyst suitable for forming polyisocyanurate comprising materials starting from polyisocyanates in combination with compounds which comprise a carboxamide group having the structure —CO—NH$_2$ available in the state of the art could be used. Examples of such catalysts are metal or quaternary ammonium carboxylates and alkoxydes, tertiary amine derivatives, LiCl in combination with epoxy (LiCl/epoxy catalyst), . . . .

Surprisingly we have further found that the catalytic activity of a polyisocyanate trimerization catalyst in a polyisocyanate composition may be interrupted and re-activated. The trimerization catalyst is preferably selected from organic salts, preferably from alkali metal, earth alkali metal and/or quaternary ammonium organic salts. More preferably said organic salt is selected from carboxylates or alkoxides and mixtures thereof, the carboxylate/alkoxide group preferably having 1-12 carbon atoms and mixtures thereof. Preferred examples are sodium carboxylates, potassium carboxylates, sodium alkoxides and potassium alkoxides. Alternatively the catalytic activity of a polyisocyanate trimerization catalyst in a polyisocyanate composition may be interrupted and re-activated by using a LiCl/epoxy catalyst in which the number of LiCl equivalents over the number of epoxy equivalents is in the range 1:2 to 1:80, more preferably in the range 1:2 to 1:40, and even more preferably 1:4 to 1:30.

The interruption and/or re-activation of the catalytic activity of the polyisocyanate trimerization catalyst is realized by adding the trimerization catalyst in combination with a compound which is selected from compounds which comprise a carboxamide group having the structure —CO—NH$_2$ to the polyisocyanate composition such that the ratio of compounds which comprise a carboxamide group over the catalyst corresponds to predefined ratios, and subsequently subjecting the polyisocyanate composition to predefined heating steps.

Adding the catalyst composition according to the present invention to a polyisocyanate (composition) and subsequently allowing this composition with optionally at least one epoxy resin compound to react gives rise to elevated temperatures (lower than 90° C.). Depending on the ratios between the different components of the composition and processing conditions more or less elevated temperatures (lower than 90° C.) will be reached. The reaction will stop at a certain point and cool down to room temperature (naturally, by itself) such that a stable partly cured polyisocyanate composition or intermediate polyisocyanurate comprising material is obtained. An elevated temperature of around 80° C. can be achieved without adding extra heat since the formation of the polyisocyanurate comprising material is exothermic.

Such an interruption of the trimerization reaction leads to partly cured polyisocyanate materials or in other words to intermediate polyisocyanurate comprising materials which may be particularly desirable when products are to be made according to processes which require a certain viscosity before producing the final cured products. In all these processes a one-component composition is desired as starting material which has a certain degree of viscosity, and which shows no or little reaction at ambient conditions for a given period of time in order to allow such compositions to be handled in such processes.

Surprisingly we have found that the pot-life of the intermediate (partly cured) polyisocyanurate comprising material may be up to several days and longer by using a trimerization catalyst composition having a specific ratio of trimerization catalyst over compounds which comprise a carboxamide group having the structure —CO—NH$_2$, without negatively influencing the final curing of the partly cured polyisocyanate composition or intermediate polyisocyanurate material afterwards.

The catalyst composition comprises compounds selected from a compound which comprises a carboxamide group having the structure —CO—NH$_2$, which implies that a compound comprising a —CO—NH—CO— group and more specifically a compound having an acylurea group having the structure —CO—NH—CO—NH— is formed as a reaction product of a polyisocyanate compound and the compound which comprises a carboxamide group having the structure —CO—NH$_2$ after addition to a polyisocyanate composition.

To allow the interruption of the trimerization reaction, the number of equivalents of compounds selected from compounds which comprise a carboxamide group having the structure —CO—NH$_2$ added to a polyisocyanate composition is smaller than four times the number of trimerization catalyst equivalents and higher than 0.75 time the number of trimerization catalyst equivalents added to a polyisocyanate composition. Preferably the number of equivalents of compounds selected from compounds which comprise a carboxamide group having the structure —CO—NH$_2$ to the number of trimerization catalyst equivalents is in the range between 1 to 3, more preferably in the range between 1.2 and 2 in order to form the "stable" intermediate polyisocyanurate comprising material according to the invention. Most preferably, the number of equivalents of compounds comprising a carboxamide group having the structure —CO—NH$_2$ over the number of trimerization catalyst equivalents is in the range between 1 and 1.5. The ratio of the number of equivalents of compounds which comprise a carboxamide group having the structure —CO—NH$_2$ over the number of trimerization catalyst equivalents may be 1 or close to 1.

In all cases, the final concentration of the compound comprising a —CO—NH—CO— group in said polyisocyanate composition is such that the ratio of —CO—NH—CO— groups over the number of isocyanate groups is at most 1, preferably at most 0.01, more preferably at most 0.0015.

According to a preferred embodiment of the first aspect of the invention, the trimerization catalyst is selected from organic salts, preferably from alkali metal, earth alkali metal and/or quaternary ammonium organic salts. More preferably said organic salt is selected from carboxylates or alkoxides and mixtures thereof, the carboxylate/alkoxide group preferably having 1-12 carbon atoms and mixtures thereof. Preferred examples are potassium carboxylates, sodium carboxylates, potassium alkoxides and potassium alkoxides. Also carboxylates/alkoxides having ring structures such as sodium or potassium benzoate are suitable trimerization catalysts. Most preferred examples are potassium acetate, potassium hexanoate, potassium ethylhexanoate, potassium octanoate, potassium lactate, N-hydroxypropyl trimethyl ammonium octanoate, N-hydroxypropyl trimethyl ammonium formate and mixtures thereof. Suitable catalysts are commercially available; examples are Catalyst LB from Huntsman or Dabco K2097 from Air Products (comprising potassium acetate), and Dabco K15 (comprising potassium octanoate). Alternatively the trimerization catalyst is selected from a LiCl/epoxy catalyst provided that the number of LiCl equivalents over the number of epoxy equivalents is in the range 1:2 to 1:80, more preferably in the range 1:2 to 1:40, and even more preferably 1:4 to 1:30.

The compound comprising the carboxamide preferably is selected from a compound according to the formula NH$_2$—CO—R$_6$ wherein R$_6$ is 1) hydrogen (—H), 2) —NR$_8$R$_9$, 3) hydrocarbyl having 1-20 carbon atoms and optionally comprising hydroxy, ether, halogen and/or amine groups, or 4) —R$_{10}$—CO—NH$_2$, wherein R$_8$ and R$_9$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein R$_{10}$ is a bivalent hydrocarbon radical having up to 8 carbon atoms. Mixtures of these carboxamides may be used as well. Preferably such carboxamides have a molecular weight of at most 499.

The hydrocarbyl groups in these carboxamides may be linear or branched, saturated or unsaturated and cyclic or non-cyclic; they may be aliphatic, aromatic or aralkylphatic.

More preferred carboxamides are those wherein R$_6$ is 1) —NR$_8$R$_9$, 2) alkyl having 1-10 carbon atoms and optionally comprising 1-3 hydroxy and/or ether groups, 3) phenyl or 4) tolyl, wherein R$_8$ and R$_9$, independently from each other, are selected from hydrogen, hydroxy, phenyl, tolyl and alkyl having 1-6 carbon atoms and optionally comprising an hydroxy and/or an ether group. Mixtures of such more preferred compounds are also more preferred.

Examples of very useful carboxamides (NH$_2$—CO—R$_6$) are the following ones:

| R$_6$ | Name |
|---|---|
| —NH$_2$ | Carbamide (urea) |
| —NHOH | Hydroxycarbamide (Hydroxy urea) |
| —NH(CH$_3$) | N-Methyl carbamide (N-Methyl urea) |
| —N(CH$_3$)$_2$ | 1,1-dimethyl carbamide (1,1-dimethyl urea) |
| —N(C$_2$H$_5$)$_2$ | 1,1-diethyl carbamide (1,1-diethyl urea) |

| $R_6$ | Name |
|---|---|
| —NH—$C_6H_5$ | Phenyl carbamide (Phenyl urea) |
| —NH—$C_6H_4$—$CH_3$ | Tolylcarbamide (Tolyl urea) |
| —H | Formamide |
| —$CH_3$ | Ethanamide |
| —$C_2H_5$ | Propionamide |
| —$OC_2H_5$ | Ethyl carbamate |
| —$OC_4H_9$ | Butyl carbamate |
| —$OC_6H_5$ | Phenyl carbamate |
| —$OCH_2$—$CH_2OH$ | Hydroxyethyl carbamate |
| —$OCH(CH_3)$—$CH_2OH$ | Hydroxypropyl carbamate |
| —$CH(CH_3)$—OH | Lactamide |
| —$C_6H_5$ | Benzamide |
| 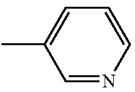 | Nicotinamide |

Most preferably carbamide (urea) is used. It is to be noted that in calculating the number of carboxamide equivalents carbamide (urea) is regarded as containing 2 carboxamide groups.

According to an embodiment, the trimerization catalyst is added and mixed to the inhibitor compound selected from a compound which comprises a carboxamide group having the structure —CO—$NH_2$ to form the stable trimerization catalyst composition. Before mixing the trimerization catalyst, it may be convenient to first dissolve the trimerization catalyst and/or the compound which comprises a carboxamide group in a solvent, like in an organic solvent like an alcohol, e.g. methanol or ethanol. Subsequently the solvent may be stripped off if desired. Premixing and mixing is conducted under ambient conditions or at elevated temperature, e.g. at 40-70° C. and is done by means of normal stirring.

In general, the polyisocyanate compound(s) according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman. Urethane modified variants of the above polyisocyanate 1) are also known in the art, see e.g. The ICI Polyurethanes Book by G. Woods 1990, $2^{nd}$ edition, pages 32-35. Polyisocyanate 4) is also widely known and commercially available. These polyisocyanates are often called crude MDI or polymeric MDI. Examples are Suprasec® 2185, Suprasec® 5025 and Suprasec® DNR ex Huntsman.

The prepolymers (polyisocyanate 5)) are also widely known and commercially available. Examples are Suprasec® 2054 and Suprasec® 2061, both ex Huntsman Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The NCO value of the polyisocyanate composition after addition of the compound having a —CO—$NH_2$ group according to the present invention may range from 10 to 48% by weight and preferably ranges from 20 to 33% by weight.

According to an embodiment, in order to form the stable intermediate polyisocyanurate comprising composition of the invention, a compound having a —CO—NH—CO— group is formed in-situ in the polyisocyanate composition by addition of a compound selected from compounds comprising a carboxamide group having the structure —CO—$NH_2$ to the polyisocyanate composition. The trimerization catalyst may be added simultaneously with addition of the compound comprising a carboxamide group or just after addition of the compound comprising a carboxamide group in the polyisocyanate composition. In case the trimerization catalyst is added simultaneously with addition of the compound comprising a carboxamide group, then the number of equivalents of compounds comprising a carboxamide group having the structure —CO—$NH_2$ to the number of catalyst compound equivalents should be below 4 and higher than 0.75. Preferably the number of equivalents of compounds comprising a carboxamide group having the structure —CO—$NH_2$ to the number of catalyst compound equivalents is in the range between 1 and 3, more preferably in the range between 1.2 and 2. Most preferably the number of equivalents of compounds comprising a carboxamide group having the structure —CO—$NH_2$ to the number of catalyst compound equivalents is in the range between 1 up to 1.5. The ratio of the number of equivalents of compounds which comprise a carboxamide group having the structure —CO—$NH_2$ to the number of trimerization catalyst equivalents may be 1 or close to 1.

According to an alternative embodiment, the trimerization catalyst composition according to the invention may be first added to a monool/polyol composition. Either the catalyst compounds or the inhibitor compound selected from compounds which comprise a carboxamide group having the structure —CO—NH$_2$ alone or in combination may be added to a polyol composition. Preferably said polyol composition comprises polyester and/or polyether polyols having an average molecular weight of 32-6000 and an average nominal functionality of 1-8. Said polyol composition may then be added to a polyisocyanate composition and may lead to the formation of a stable intermediate polyisocyanurate comprising composition according to the invention further comprising polyisocyanate prepolymers. Said prepolymers in the stable intermediate polyisocyanurate comprising composition have free NCO groups left and have an NCO value of 5-30% by weight, more preferably an NCO value of between 15 and 25%, and are the reaction product of one or more of the polyisocyanate compounds and one or more of the polyol compounds.

A stable intermediate polyisocyanurate comprising material may be obtained after a process which comprises adding and mixing the above stable trimerization catalyst composition to a polyisocyanate composition and allowing this composition to react with optionally at least one epoxy resin compound. The reaction mixture will start to react, subsequently reach an elevated temperature (lower than 90° C.) and naturally stop (cool down to room temperature). In other words, the reaction mixture will reach elevated temperatures (below 90° C.) but subsequently stop to further react (cure) due to the presence of a certain degree of inhibitor molecules in the composition.

The stable intermediate polyisocyanurate comprising material according to the present invention may be used in a wide variety of applications. As an example, it could be particularly suitable to make prepregs to produce printed circuit boards having a high Tg, suitable for automotive applications as part under the hood. It could also be used to produce sheet moulding compounds (SMC) or bulk moulding compounds (BMC) used as a reactive intermediate to make large and light weight composite parts. The pre-reacted polyisocyanurate compositions (the intermediate and partly cured polyisocyanurate comprising material according to the invention), or commercial products made thereof (such as prepregs) could be stored under specific and controlled conditions, such as under vacuum, nitrogen or at low temperature (in a freezer), in order to extend their pot-life Optionally an alcohol, selected from a monool and/or a polyol, preferably selected from polyester and/or polyether polyols may be further added to the stable intermediate polyisocyanurate comprising material.

According to a third aspect of the present invention a process for further curing the intermediate polyisocyanurate comprising material is disclosed.

The intermediate polyisocyanurate comprising material according to the first aspect of the present invention is stable and may be used to further cure. Such a further cured polyisocyanurate comprising composition is obtained by at least adding an epoxy resin to the intermediate polyisocyanurate comprising composition (if not yet present) and heating up to an elevated temperature above 90° C., preferably above 100° C., more preferably above 120° C., most preferably equal to or above 125° C. The intermediate polyisocyanurate comprising material may be in the form of a liquid, a paste, or even a solid . . . depending on how far the intermediate polyisocyanurate comprising material was allowed to react (according to the first aspect).

The intermediate polyisocyanurate comprising material according to the invention should comprise at least an epoxy resin in order to allow a further curing and/or to achieve a fully cured polyisocyanurate material. Preferably the number of equivalents of compounds having a —CO—NH—CO— group in the intermediate polyisocyanurate comprising material is smaller or equal than the number of epoxy equivalents present and/or added to said intermediate polyisocyanurate comprising composition.

According to an embodiment, the trimerization catalyst used to make the intermediate polyisocyanurate comprising material may be selected from any state of the art trimerization catalyst as described in embodiments of the first aspect of the invention.

After interruption of the trimerization reaction within the partly cured polyisocyanate composition or intermediate polyisocyanurate material, said partly cured polyisocyanate composition may be further cured after optionally further addition of a trimerization catalyst material selected from alkali metal, earth alkali metal, quaternary ammonium organic salt catalysts and/or LiCl/epoxy catalysts as described in embodiments of the first aspect of the invention and subsequently heating said intermediate polyisocyanurate material up to temperatures above 90° C., preferably above 100° C., more preferably above 120° C., most preferably equal to or above 125° C. More preferably the trimerization catalyst is selected from carboxylates or alkoxides salts and mixtures thereof, the carboxylate/alkoxide group preferably having 1-12 carbon atoms and mixtures thereof.

According to an embodiment, the trimerization catalyst used to make the intermediate polyisocyanurate comprising material is selected from organic salts, preferably from alkali metal, earth alkali metal, quaternary ammonium organic salts and/or LiCl/epoxy catalysts. More preferably said organic salt trimerization catalyst is selected from carboxylates or alkoxides salts and mixtures thereof, the carboxylate/alkoxide group preferably having 1-12 carbon atoms and mixtures thereof as described in embodiments of the first aspect of the invention. Preferred examples are potassium carboxylates, sodium carboxylates, potassium alkoxides and potassium alkoxides. After interruption of the trimerization reaction within the partly cured polyisocyanate composition or intermediate polyisocyanurate material, the catalytic activity of the trimerization catalyst may be re-activated by heating said intermediate polyisocyanurate material up to temperatures above 90° C., preferably above 100° C., more preferably 120° C., most preferably equal to or above 125° C. The intermediate polyisocyanurate comprising material should comprise at least an epoxy resin in order to allow the further curing and/or to achieve a fully cured polyisocyanurate material. In case an epoxy resin was already present as part of the LiCl/epoxy trimerisation catalyst, the amount of epoxy resin being present in the LiCl/epoxy trimerisation catalyst may not be sufficient for further curing and in that case additionally an epoxy resin must be added for further curing.

Before finally curing the stable intermediate polyisocyanurate comprising composition, the stable intermediate polyisocyanurate comprising composition may be fed into a mould in order to give it a certain shape or into a cavity of an object in order to provide the object with a polyisocyanurate interior or onto a surface to provide such a surface with a polyisocyanurate cover or it may be used to repair an object and in particular a pipe by applying it onto the interior and/or the exterior surface of such an object.

The epoxy resin used preferably is selected from any epoxy resin which is liquid at 20° C.

Examples of epoxy resins are:

I) Polyglycidyl and poly(β-methylglycidyl) esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexahydrophthalic acid, may also be used.

Furthermore, aromatic polycarboxylic acids, such as, for example, phthalic acid, isophthalic acid or terephthalic acid, may be used.

II) Polyglycidyl or poly(β-methylglycidyl) ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins. Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis (2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis (3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis (4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl) ether.

V) Cycloaliphatic epoxy resins, such as, for example, bis (2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl) propane.

Particularly preferred are those mentioned in I and II and most preferred are those mentioned in II.

If an epoxy resin is used which contains hydroxyl groups or other isocyanate-reactive hydrogens then these hydroxyl groups and hydrogens are not taken into account in calculating the index or the number of hydroxyl equivalents.

Before or alternatively after the stable intermediate polyisocyanurate comprising material is formed, additives may be added to it or to its constituents such that e.g. composite materials are produced thereby using common production processes. Examples of additives are fillers, fibres, .... The additives (also referred to in state of the art as "to-be-bonded material") are preferably solid materials at room temperature. Examples of materials which may be used are: wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

Further examples of additives are further non-isocyanate-reactive solvents, polyols and monools, other catalysts, blowing agents, surfactants, water scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

The monool and/or polyol optionally used in the present invention preferably has an average nominal hydroxy functionality of 1-8 and an average molecular weight of 32-8000. Mixtures of monools and/or polyols may be used as well.

Examples of such monools are methanol, ethanol, propanol, butanol, phenol, cyclohexanol and hydrocarbon monools having an average molecular weight of 32-6000 like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Such monools and polyols are commercially available. Useful examples are Daltocel F555 and Daltocel F442, which are all polyether triols from Huntsman, Voranol P400 and Alcupol R1610, which are polyether polyols from DOW and Repsol, respectively, and Priplast 1838 and 3196 which are high molecular weight polyester polyols from Croda, and Capa 2043 polyol, a linear polyesterdiol of average MW of about 400 from Perstorp, and K-flex polyols 188 and A308 which are polyester polyols from King Industries having a MW of about 500 and 430 respectively, and aromatic polyester polyols like Stepanpol PH56 and BC180 having average molecular weights of about 2000 and 600 respectively, and Neodol 23E which is an aliphatic monool from Shell.

Most preferred are polyester and polyether polyols having an average molecular weight of 200-6000 and an average nominal functionality of 1-8.

The solvent having no isocyanate-reactive groups, which optionally may be used, preferably is an organic solvent which is liquid at 20° C. Solvents having a viscosity at 20° C. of 3000 mPa·s or less as measured according to ASTM D445-11a are regarded as liquid solvents. Most preferred are organic, liquid solvents which are able to dissolve more than 1 mg of a certain compound comprising the —CO—NH—CO— group per liter of solvent at 20° C.

Those skilled in the art can easily determine whether or not an organic liquid is suitable for use as solvent in the present invention, certainly with the above guidance. Examples of suitable solvents are esters (such as ethyl acetate, propyl acetate, propylene carbonate, phthalate esters), ketones (such as acetone, methyl ethyl ketone, methyl isobutyl ketone, cyclohexanone), aliphatic hydrocarbons (such as cyclohexane, heptane), chlorinated hydrocarbons (such as chloroform, dichloromethane), aromatic solvents (such as benzene, toluene), ethers (such as dimethyl ether, diethyl ether, dioxane, tetrahydrofuran) and mixtures thereof. Most preferably solvents are selected which have a low boiling point at ambient pressure or under vacuum (then they may be stripped off from the curable composition easily). They should preferably be able to dissolve at least 10 g of carboxamide per kg of solvent. The amount of solvent may vary between wide ranges. The lower limit is determined by the desired type and amount of compound comprising the carboxamide and its solubility in the selected solvent. The upper limit is determined by considerations of convenience and cost: the less the better.

The invention is illustrated with the following examples.

EXAMPLES

Chemicals Used

Suprasec 2020 polyisocyanate ex Huntsman: An uretonimine modified polyisocyanate, in these examples indicated as S2020
Carbamide (urea) 99%+ ex Acros Organics
Araldite DY-T, ex Huntsman, triglycidylether of trimethylolpropane, indicated herein as DY-T.
Alcupol R1610, ex Repsol glycerol initiated polyoxypropylene polyol with an OH-value of 160 mg KOH/g
Dabco K2097 ex Air Products, is a solution of potassium acetate at 50 wt % in diethylene glygol Jeffcat TR-90 ex Huntsman is a 1,3,5-tris(3-(dimethylamino)propyl)-hexahydro-s-hydrazine catalyst
Daltocel F526 is a polyethylene triol ex Huntsman, herein referred as F526, having an OH-value of 127 mg KOH/g
Solution of tetramethyl ammonium formate (>99.99% pure) at 30 wt % in water ex Sigma Aldrich, in this patent referred as TMA formate
Araldite, Suprasec, Jeffamine, Jeffcat and Daltocel are trademarks of the Huntsman Corporation or an Affiliate thereof and has been registered in one or more but not all countries.

In none of the following examples biuret formation was observed.

Examples 1 to 9 describe the preparation of stable trimerization catalyst compositions according to the invention, comprising a carboxamide group having the structure —$CONH_2$ and a trimerization catalyst. Examples 10 to 18 describe the preparation of a stable partly cured polyisocyanurate comprising composition according to the invention.

Examples 19 to 27 describe the preparation of final cured polyisocyanurate comprising composition according to the invention Examples 1 to 5: Use of Dabco K2097 as a Trimerization Catalyst The necessary amounts of urea carbamide needed to prepare the catalyst compositions of examples 1 to 5 were first added to the required amounts of Daltocel F526, and let to dissolve in this polyol pre-heated to 100° C., while stirring. After approximately one hour of reaction, clear, fluid and homogeneous solutions of urea carbamide in Daltocel F526 were obtained.

Then, the necessary amounts of the previously prepared solutions were mixed at room temperature for about 15 minutes with the required amounts of Alcupol R1610 and Dabco K2097 catalyst, in order to prepare the stable trimerization catalyst compositions described in table 1.

Examples 6 and 7: Use of Tetramethyl Ammonium Formate as a Trimerization Catalyst The stable trimerization catalyst compositions 6 and 7 were prepared according to the same procedure as for examples 1 to 5, but using a solution of tetramethyl ammonium formate at 30 wt % in water as the trimerization catalyst instead of Dabco K2097. The relative amounts of Daltocel F526, urea carbamide, Alcupol R1610 and tetramethyl ammonium formate are summarized in table 1.

Examples 8 and 9: Use of Jeffcat TR-90 as a Trimerization Catalyst

The stable trimerization catalyst compositions 8 and 9 were prepared according to the same procedure as for examples 1 to 5, but using Jeffcat TR-90 as the trimerization catalyst instead of Dabco K2097.

The relative amounts of Daltocel F526, urea carbamide, Alcupol R1610 and Jeffcat TR-90 are summarized in Table 1.

Examples 10 to 18 Describe the Preparation of a Stable Partly Cured Polyisocyanurate Comprising Composition According to the Invention To 85 pbw of Suprasec 2020 kept under stirring at room temperature in a container of appropriate volume, 14 pbw of the stable trimerization catalyst compositions of table 1 were progressively added (about 1 g per minute), in order to form the partly cured polyisocyanurate comprising compositions according to the invention.

As the reaction takes place, the temperature of the reacting mixture progressively rises into the blend, without the need of any extra external source of energy, before dropping again by itself once the pre-reaction step is completed. The so-obtained partly cured polyisocyanurate compositions were cooled down to room temperature, and stored in a close container, under nitrogen atmosphere until use.

Figure 2:
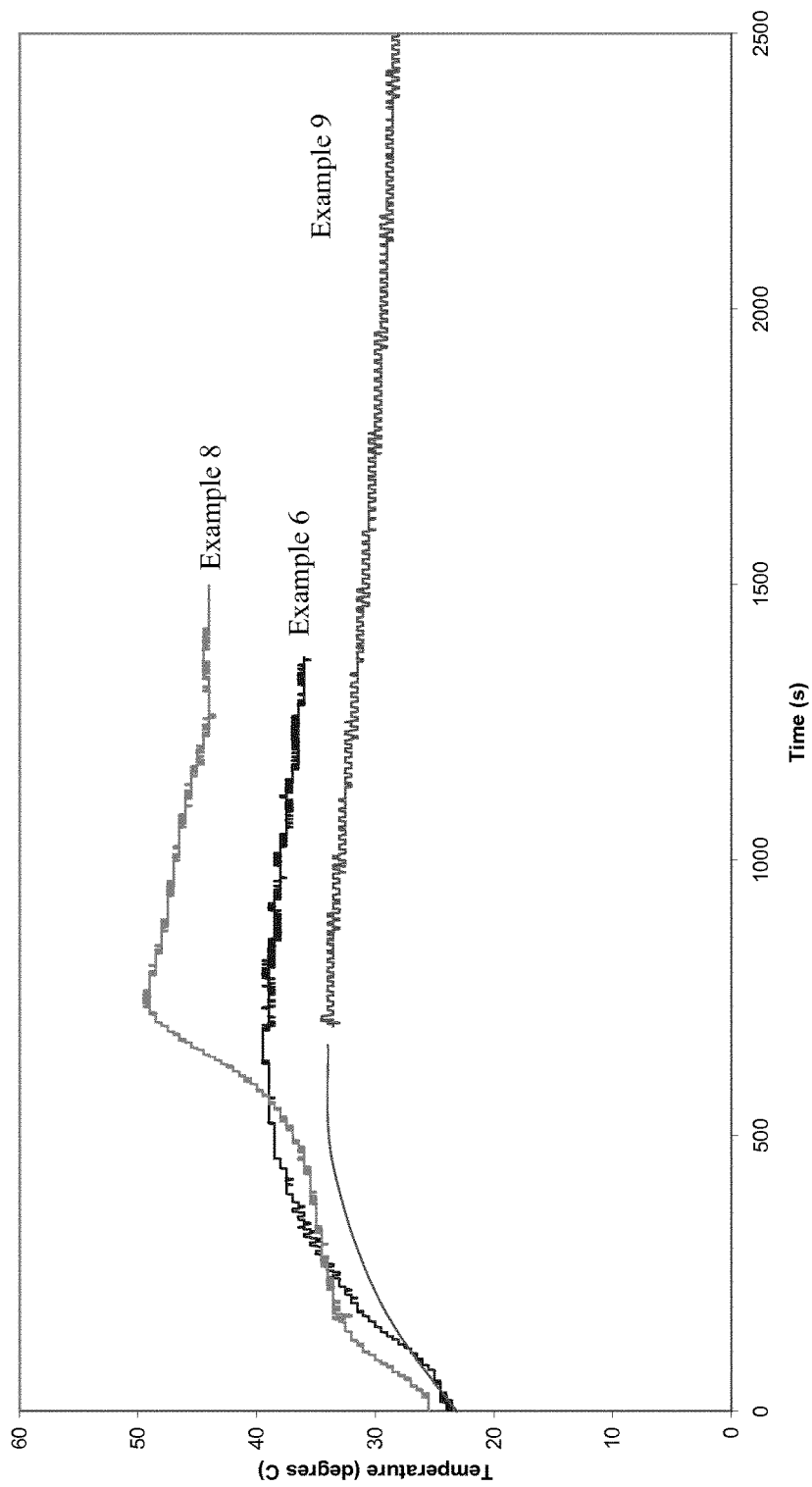
FIG. 2 is a graphical representation of the temperature profile of reacting mixtures during the formation of partially cured polyisocyanurate comprising materials.

The temperature profiles of the preparation of some examples of partly cured polyisocyanurate comprising materials are given on FIGS. 1 and 2.

Figure 3:
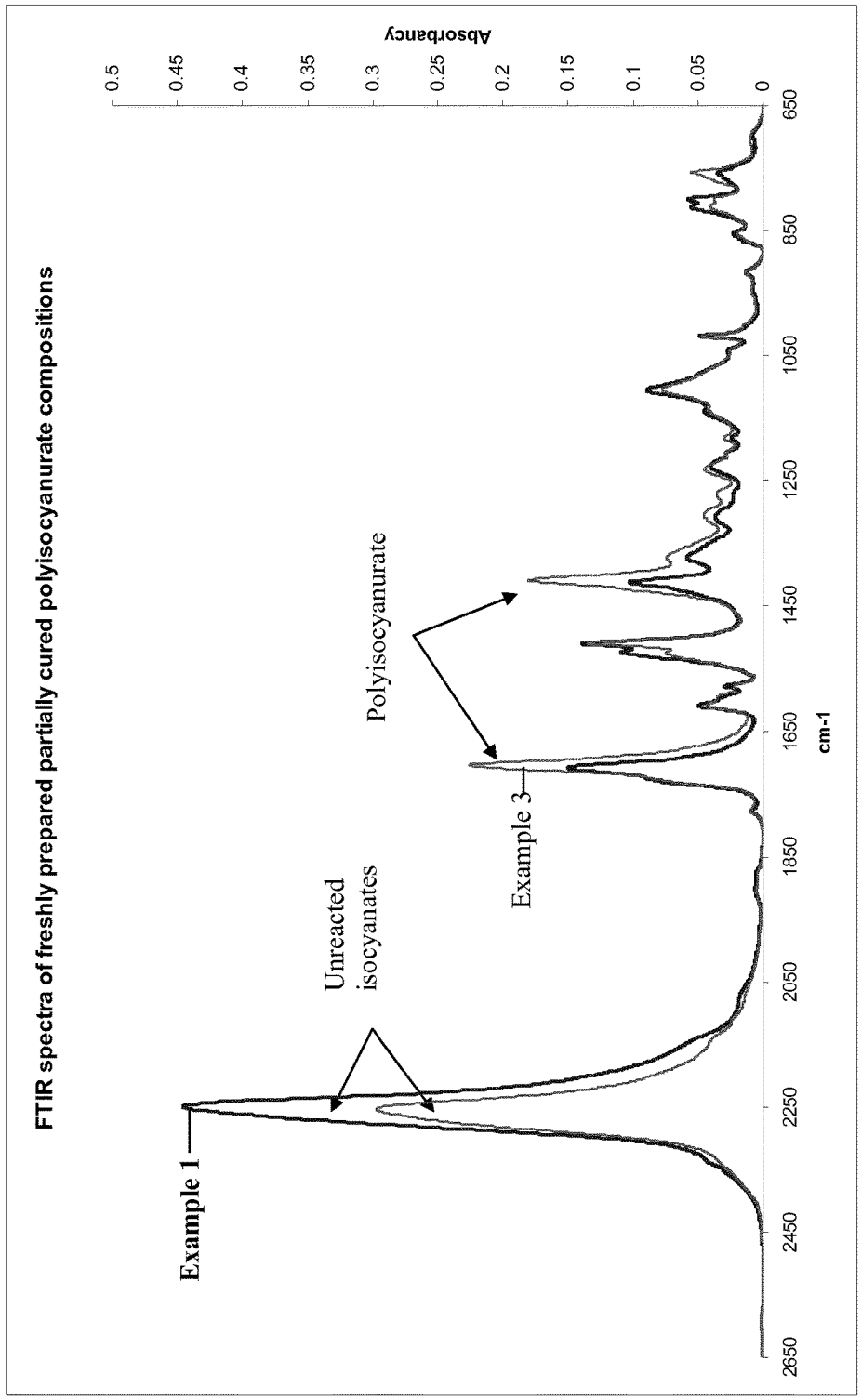
FIG. 3 is an FTIR spectra of partially cured polyisocyanurate compositions.
Figure 4:
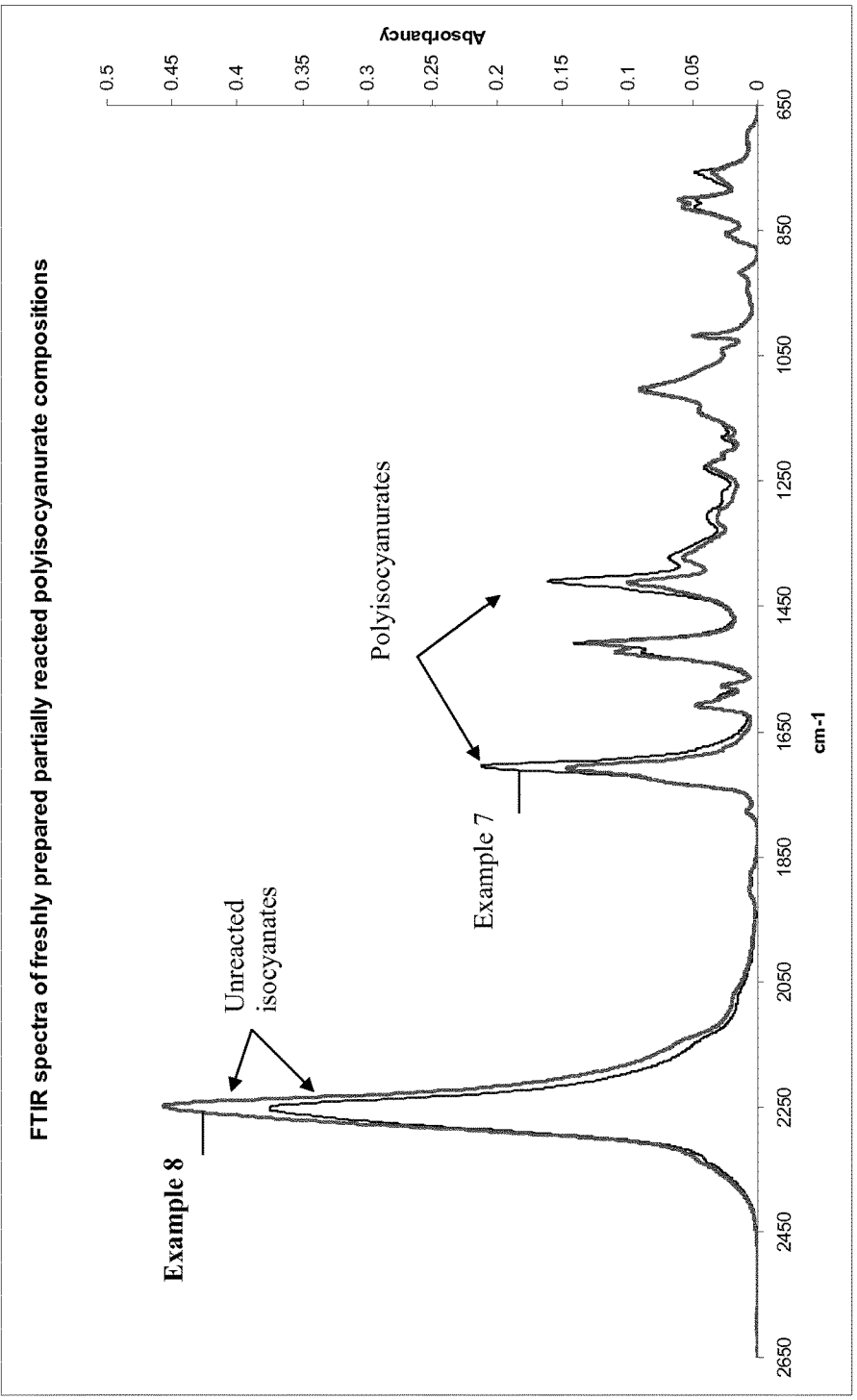
FIG. 4 is an FTIR spectra of partially cured polyisocyanurate compositions.

In all these examples, the presence of polyisocyanurate groups giving characteristic absorbencies around 1410 cm$^{-1}$ and 1705 cm$^{-1}$ was confirmed by mean of infrared spectroscopy (FTIR) using an ATR set-up. A few examples of such FTIR spectra are given on FIGS. 3 and 4.

Lastly, once cooled down to room temperature (approximately 1 h 30 after preparation), the NCO value of the partly cured polyisocyanurate compositions above was titrated according to the Huntsman internal procedure PU/IV-1 for NCO titration, consisting in reacting the isocyanates with an excess of n-dibutylamine to form ureas. The unreacted amines are then titrated with standard nitric acid to the colour change of bromocresol green indicator or to a potentiometric end-point. The percentage of NCO or NCO-value is defined as the weight percentage of NCO-groups present in the product.

The NCO values were re-checked 24 h later according to the same procedure, in order to assess the stability of these blends: less than 10% change after 24 h at room temperature.

The ingredients used, the amounts in parts by weight, the —NCO values of the fresh and one day-old compositions, and the equivalent ratio of carboxamide molecules having a —CONH$_2$ per catalyst are given in Table 2.

After cooling down to room temperature, 5 pbw of Alcupol R1610 at 6 wt % of Dabco K2097, and 10 pbw of Araldite DY-T were added, and mixed for a few minutes.

30 g of the so-obtained resin compositions of examples 19 to 28 were allowed to cure in a 4 mm deep open mould for 2 h at 150° C., so as to prepare the fully cured polyisocyanurate comprising materials of the present invention.

The glass transition of temperature (Tg) of the obtained materials was determined by differential mechanical thermo-analysis (DMTA) on a TA Q800 apparatus with a heating rate of 3° C./min and a frequency of 1 Hz (measured according to ASTM 4065). The Tg was defined as the first inflection point of the storage modulus (E') curve obtained with the TA Universal analysis software.

The ingredients used, the Tg of the cured polyisocyanurate comprising materials, and the equivalent ratio of epoxy group per molecule having a —CONH$_2$ group are given in Table 3.

TABLE 1

| Stable catalyst compositions | Daltocel F526 (in g) | Urea carbamide (mequivalents) [1] | Alcupol R1610 (in g) | Catalyst type/amount (in g) | Catalyst [2] (mmols) |
|---|---|---|---|---|---|
| 1 | 55.4 | 57.1 | 138.6 | Dabco K2097/4.3 | 14.1 |
| 2 | 56.3 | 27.1 | 138.6 | Dabco K2097/4.3 | 14.2 |
| 3 | 56.7 | 14.1 | 138.6 | Dabco K2097/4.3 | 14.2 |
| 4 | 57.0 | 5.4 | 141.4 | Dabco K2097/1.4 | 5.4 |
| 5 | 57.0 | 4.4 | 141.4 | Dabco K2097/1.4 | 5.4 |
| 6 | 55.4 | 57.1 | 137.7 | TMA formate/5.2 | 14.1 |
| 7 | 57.0 | 5.4 | 141.1 | TMA formate/1.7 | 5.4 |
| 8 | 56.7 | 14.1 | 141.4 | Jeffcat TR-90/1.5 | 14.1 [3] |
| 9 | 55.4 | 57.1 | 141.4 | Jeffcat TR-90/1.5 | 14.1 [3] |

[1] Urea carbamide being considered as a difunctional molecule
[2] Total amount of catalyst also taking into account the 0.24 wt % of potassium lactate catalyst present as an impurity in Daltocel F526
[3] Jeffcat TR-90 considered as a trifunctional molecule.

TABLE 2

| Examples | Isocyanate type/Amount (in pbw) | Catalyst composition/amount (in pbw) | Equivalent ratio —CONH$_2$/catalyst | NCO [1] value of the fresh partly cured composition | NCO value of the 1-day old partly cured composition |
|---|---|---|---|---|---|
| 10 | S2020/85 | Example 1/14 | 4.0 | 19.26 | 19.12 |
| 11 | S2020/85 | Example 2/14 | 1.9 | 17.31 | 17.29 |
| 12 | S2020/85 | Example 3/14 | 1.0 | n.a. [2] | n.a. [2] |
| 13 | S2020/85 | Example 4/14 | 1.0 | 17.09 | 16.92 |
| 14 | S2020/85 | Example 5/14 | 0.8 | 15.84 | 15.29 |
| 15 | S2020/85 | Example 6/14 | 4.0 | 21.71 | 21.35 |
| 16 | S2020/85 | Example 7/14 | 1.0 | 17.59 | 17.51 |
| 17 | S2020/85 | Example 8/14 | 1.0 | 19.49 | 19.32 |
| 18 | S2020/85 | Example 9/14 | 4.0 | 22.53 | 21.88 | n.a. means not applicable
[1] As a reference, pure S2020 as a NCO value of 29.21%, compared with 23.83% for a fresh prepolymer made of 85 pbw of S2020 with 4 pbw of Daltocel F526 and 10 pbw of Alcupol R1610 (average composition of previous examples but without catalyst nor compound containing a —CONH$_2$ group)
[2] Too viscous blend to be sampled and titrated. NCO value expected to be below 15%.

Examples 19 to 27 Describe the Preparation of Final Cured Polyisocyanurate Comprising Compositions According to the Invention To the previously prepared polyisocyanurate comprising material kept at room temperature or briefly heated up again to 40 to 50° C. in order to make them more fluid, a given amount of the Araldite DY-T epoxy resin was added, and mixed for a few minutes, in order to obtain a further curable polyisocyanurate composition.

In example 28, the same partly cured polyisocyanurate comprising material as example 18 was prepared again.

TABLE 3

| Examples | Partly cured polyisocyanurate composition/amount (pbw) | Epoxy kind/amount (pbw) | Equivalent ratio epoxy/R—CONH$_2$ | Tg (E') in ° C. |
|---|---|---|---|---|
| 19 | Example 10/99 | 10.0 | 20.0 | >275 |
| 20 | Example 11/99 | 4.8 | 20.0 | >275 |
| 21 | Example 12/99 | 2.5 | 20.0 | >275 |
| 22 | Example 13/99 | 1.0 | 20.0 | 198.3 |
| 23 | Example 14/99 | 0.8 | 20.0 | 200.2 |
| 24 | Example 15/99 | 10.0 | 20.0 | 194.2 |

TABLE 3-continued

| Examples | Partly cured polyisocyanurate composition/ amount (pbw) | Epoxy kind/ amount (pbw) | Equivalent ratio epoxy/ R—CONH$_2$ | Tg (E') in ° C. |
|---|---|---|---|---|
| 25 | Example 16/99 | 1.0 | 20.0 | 189.0 |
| 26 | Example 17/99 | 2.5 | 20.0 | 170.8 |
| 27 | Example 18/99 | 10.0 | 20.0 | 156.0 |
| 28 | Example 18/99 | 10.0 | 20.0 | >275 |

The invention claimed is:

1. A process for making a polyisocyanurate composition, the process comprising:
   mixing a polyisocyanate composition with one or more compounds which comprise a group having the structure —CO—NH$_2$;
   mixing an amount of a trimerization catalyst compound with the polyisocyanate composition and the one or more compounds which comprise a group having the structure —CO—NH$_2$ to form a reaction mixture, wherein the amount of trimerization catalyst compound is such that the number of equivalents of compounds which comprise a group having the structure —CO—NH$_2$ over the number of trimerization catalyst equivalents is below 4 and higher than 0.75; and
   allowing the reaction mixture to react to form a polyisocyanurate composition comprising polyisocyanurate compounds,
   wherein the polyisocyanurate composition comprises 5 to 30 wt. % free isocyanate groups, and
   wherein the concentration of the polyisocyanurate compounds in the polyisocyanurate composition does not change more than 10% from its initial value when kept at room temperature and ambient pressure for at least 5 hours.

2. The process according to claim 1, wherein the step of allowing the composition to react gives rise to an elevated temperature below 90° C. without externally heating the mixture and naturally cools down to room temperature.

3. The process according to claim 1, wherein the polyisocyanate composition further comprises a monool or polyol composition having an average molecular weight of preferably 32 to 6000 Daltons and an average nominal functionality of 1 to 8.

4. The process according to claim 1, wherein the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

5. The process according to claim 1, wherein the trimerization catalyst compound is selected from one or more organic salts.

6. The process according to claim 1, wherein the trimerization catalyst compound is selected from a composition containing LiCl and an epoxy resin provided that the number of LiCl equivalents over the number of epoxy equivalents is in the range 1:2 to 1:80.

7. The process according to claim 1, further comprising adding an epoxy resin to the polyisocyanate composition before or after the step of allowing the reaction mixture to react, wherein the amount of epoxy resin added is such that the number of equivalents of compounds having a —CO—NH$_2$ group in the polyisocyanate composition is smaller than or equal to the number of epoxy equivalents.

8. A polyisocyanurate composition obtained by the process according to claim 1.

9. The polyisocyanurate composition according to claim 8, further comprising additives, a to-be-bonded material, or combinations thereof.

10. The process according to claim 1, wherein the polyisocyanurate composition comprises 15 to 25 wt. % free isocyanate groups.

11. The process according to claim 1, wherein the final concentration of the polyisocyanurate compounds does not change more than 10% from its initial value when kept at room temperature and ambient pressure for at least 24 hours.

12. The process according to claim 1, wherein the number of equivalents of compounds which comprise a group having the structure —CO—NH$_2$ over the number of trimerization catalysts equivalents is below 3 and higher than 1.

13. The process according to claim 1, wherein the number of equivalents of compounds which comprise a group having the structure —CO—NH$_2$ over the number of trimerization catalysts equivalents is below 2 and higher than 1.

14. The process according to claim 1, wherein the number of equivalents of compounds which comprise a group having the structure —CO—NH$_2$ over the number of trimerization catalysts equivalents is below 1.5 and higher than 1.

15. The process according to claim 3, wherein the monool or polyol composition comprises polyester, polyether polyols, or combinations thereof.

16. The process according to claim 5, wherein the organic salt is selected from alkali metal, earth alkali metal, organic salts, quaternary ammonium organic salts, carboxylates, alkoxides, or mixtures thereof.

17. The process according to claim 16, wherein the carboxylates or alkoxides comprise potassium acetate, potassium hexanoate, potassium ethylhexanoate, potassium octanoate, potassium lactate, sodium ethoxide, sodium formate, potassium formate, sodium acetate, and potassium benzoate.

18. The process according to claim 6, wherein the number of LiCl equivalents over the number of epoxy equivalents is in the range 1:2 to 1:40.

19. The process according to claim 6, wherein the number of LiCl equivalents over the number of epoxy equivalents is in the range 1:4 to 1:30.

20. The process according to claim 1, wherein the trimerization catalyst compound is simultaneously mixed with the polyisocyanate composition and the one or more compounds containing a group having the structure —CO—NH$_2$ to form the reaction mixture.

21. The polyisocyanurate composition according to claim 8, wherein the polyisocyanurate composition further comprises an epoxy resin.

22. A process for further curing the polyisocyanurate composition according to claim 21, comprising heating the material according to claim 21 at a temperature greater than or equal to 90° C. for a time ranging from 2 minutes to 2 hours.

23. The process according to claim 22, said process further comprising adding a trimerization catalyst to the polyisocyanurate composition before heating the polyisocyanurate composition.

24. The process according to claim 22, said process further comprising adding and mixing at least one of an additive and a to-be-bonded material with the polyisocyanurate composition before heating the polyisocyanurate composition.

25. A process for making a polyisocyanurate composition, the process comprising:

mixing a polyisocyanate composition with one or more compounds which comprise a group having the structure —CO—NH$_2$;

mixing an amount of a trimerization catalyst compound with the polyisocyanate composition and the one or more compounds which comprise a group having the structure —CO—NH$_2$ to form a reaction mixture, wherein the amount of trimerization catalyst compound is such that the number of equivalents of compounds which comprise a group having the structure —CO—NH$_2$ over the number of trimerization catalyst equivalents is below 4 and higher than 0.75; and allowing the reaction mixture to react to form a polyisocyanurate composition comprising polyisocyanurate compounds and a compound having an acylurea group comprising the structure —CO—NH—CO—NH—, wherein the polyisocyanurate composition comprises 5 to 30 wt. % free isocyanate groups, and wherein the concentration of the polyisocyanurate compounds in the polyisocyanurate composition does not change more than 10% from its initial value when kept at room temperature and ambient pressure for at least 5 hours.

26. The process according to claim 25, wherein the trimerization catalyst compound is simultaneously mixed with the polyisocyanate composition and the one or more compounds containing a group having the structure —CO—NH$_2$ to form the reaction mixture.

* * * * *